United States Patent
Koslowski et al.

(10) Patent No.: US 12,091,854 B2
(45) Date of Patent: Sep. 17, 2024

(54) CONSTRUCTION PANEL WITH HIGH RESISTANCE TO FIRE AND A METHOD FOR PRODUCING A CONSTRUCTION PANEL WITH HIGH RESISTANCE TO FIRE

(71) Applicant: Knauf Performance Materials GmbH, Dortmund (DE)

(72) Inventors: Thomas Koslowski, Dortmund (DE); Werner Schwiebacher, Cologne (DE); Kai Martin, Dortmund (DE); Bert Naurath, Bochum (DE); Albert Klöckener, Dortmund (DE)

(73) Assignee: Knauf Performance Materials GmbH, Dortmund (DE)

(*) Notice: Subject to any disclaimer, the term of this patent is extended or adjusted under 35 U.S.C. 154(b) by 203 days.

(21) Appl. No.: 17/611,600

(22) PCT Filed: May 19, 2020

(86) PCT No.: PCT/EP2020/063989
§ 371 (c)(1),
(2) Date: Nov. 16, 2021

(87) PCT Pub. No.: WO2020/234308
PCT Pub. Date: Nov. 26, 2020

(65) Prior Publication Data
US 2022/0145627 A1    May 12, 2022

(30) Foreign Application Priority Data
May 22, 2019  (EP) .................................... 19175953

(51) Int. Cl.
| | | |
|---|---|---|
| E04C 2/06 | (2006.01) | |
| C04B 14/18 | (2006.01) | |
| C04B 14/42 | (2006.01) | |
| C04B 16/02 | (2006.01) | |
| C04B 28/18 | (2006.01) | |
| C04B 40/02 | (2006.01) | |
| C04B 111/28 | (2006.01) | |
| E04C 2/04 | (2006.01) | |

(52) U.S. Cl.
CPC .............. *E04C 2/06* (2013.01); *C04B 14/185* (2013.01); *C04B 14/42* (2013.01); *C04B 28/18* (2013.01); *E04C 2/049* (2013.01); *C04B 16/02* (2013.01); *C04B 40/024* (2013.01); *C04B 2111/28* (2013.01)

(58) Field of Classification Search
None
See application file for complete search history.

(56) References Cited

U.S. PATENT DOCUMENTS

| | | | |
|---|---|---|---|
| 3,590,111 A | 6/1971 | Gebefugi | |
| 2014/0216653 A1* | 8/2014 | Wu | ...... C04B 41/4596 427/427 |
| 2021/0238844 A1* | 8/2021 | Bräker | .......... E04B 1/6812 |

FOREIGN PATENT DOCUMENTS

| | | |
|---|---|---|
| CN | 1559954 A | 1/2005 |
| EP | 0321583 A1 | 6/1989 |
| JP | 53009823 A | 1/1978 |
| JP | S6385038 A | 4/1988 |
| JP | 09286643 A | 11/1997 |
| JP | 11171633 A | 6/1999 |
| JP | 2001226166 A | 8/2001 |
| JP | 2002294979 A | 10/2002 |
| JP | 2004510673 A | 4/2004 |
| JP | 2007238396 A | 9/2007 |
| JP | 2014152101 A | 8/2014 |
| WO | 2020234308 A1 | 11/2020 |

OTHER PUBLICATIONS

English Translation of the Search Report and Written Opinion for PCT/EP2020/063989 (10 pages). (Year: 2020).*
"International Search Report for PCT Patent Application No. PCT/EP2020/063989", Mailed Date: Aug. 3, 2020, 4 Pages.
"Written Opinion of the International Searching Authority for PCT Patent Application No. PCT/EP2020/063989", Mailed Date: Aug. 3, 2020, 9 Pages.
"Manufacture of Inorganic Refractory Moldings", Thomas Scientific, Aug. 30, 1982, 1 Page.
Podobina, et al., "Development of the technology of production of air-entrained silicates with additive expanded perlite sand", In Chemical Absracts, Aug. 11, 1975, 1 Page.
"Office Action for Chinese Patent Application No. 202080033156.3", Mailed Date: Sep. 20, 2023, 5 pages.
"Office Action for Russian Patent Application No. 2021131100", Mailed Date: Sep. 28, 2023, 2 pages.
Office Action for Japanese Application No. 2021-563337, dated Apr. 25, 2024, 7 pages.

* cited by examiner

*Primary Examiner* — Jeffrey D Washville
(74) *Attorney, Agent, or Firm* — Calfee, Halter & Griswold LLP

(57) ABSTRACT

The invention relates to a construction panel with high resistance to fire and to a method for producing a construction panel with high resistance to fire.

13 Claims, No Drawings

CONSTRUCTION PANEL WITH HIGH RESISTANCE TO FIRE AND A METHOD FOR PRODUCING A CONSTRUCTION PANEL WITH HIGH RESISTANCE TO FIRE

The invention relates to a construction panel with high resistance to fire and to a method for producing a construction panel with high resistance to fire.

Construction panels are used in drywall construction. For example, construction panels are used as cladding elements in drywall construction, for example for covering walls or pipes. Construction panels are also used, for example, to create partition walls. In particular, construction panels are also used to produce ventilation ducts.

For reasons of fire protection, construction panels with high resistance to fire, which are also referred to as fire-protection panels, are also regularly required.

Construction panels with high resistance to fire are known, for example, in the form of construction panels made from hydraulically set cement, in particular hydraulically set Portland cement, as well as alumina cement or high-alumina cement.

Furthermore, fire protection panels with high resistance to fire are also known in the form of calcium silicate panels, that is to say in the form of construction panels based on at least one mineralogical phase in the three-component $CaO$—$SiO_2$—$H_2O$ system. A mineralogical phase made of this three-component system is also regularly referred to as the CSH phase and a construction panel produced based on such a phase is referred to as a CSH construction panel.

In the three-component $CaO$—$SiO_2$—$H_2O$ system, there are numerous mineralogical phases which differ from one another with regard to their respective proportions of the phases $CaO$, $SiO_2$, and $H_2O$. A common mineralogical phase in the three-component $CaO$—$SiO_2$—$H_2O$ system, on the basis of which construction panels are manufactured, is, for example, the mineralogical phase tobermorite with the chemical formula $Ca_5Si_5O_{17} \cdot 5\ H_2O$.

However, numerous substances from which construction panels are regularly made do not give the construction panel a high level of fire resistance because, for example, these substances break down or burn given uninterrupted high temperature loading.

In order to offer a high level of fire resistance, however, construction panels must be able to withstand uninterrupted high temperature loading for a lengthy period of time.

Furthermore, it is normally desired that the construction panels have the lowest possible density. Regardless of the low density, at the same time it is normally desired that the panels have high mechanical stability, in particular even under mechanical stress. At the same time, it is also desired that the construction panels are easy to process mechanically, for example using drilling, stapling or sawing.

The underlying object of the present invention is to provide a construction panel with high resistance to fire.

A further object of the invention is to provide such a construction panel with high resistance to fire that can also be made available with a low density.

A further object of the invention is to provide such a construction panel with high resistance to fire that can be made available with a low density and yet at the same time with high mechanical stability, even given uninterrupted high temperature loading for a lengthy period of time.

A further object of the invention is to make available such a construction panel with high resistance to fire, which can be made available with a low density and yet at the same time with high mechanical stability, even given uninterrupted high temperature loading for a lengthy period of time, wherein the construction panel is also easy to process mechanically.

A further object of the invention is to provide a method for making such a construction panel available.

In order to be able to make such a construction panel available, according to the invention a construction panel is made available that has high resistance to fire and comprises:
Xonotlite;
Expanded perlite; and,
Fibers.

The invention is based on the surprising finding that the above objects can be achieved by providing a construction panel with high resistance to fire which comprises xonotlite, expanded perlite, and fibers.

Xonotlite is a calcium silicate with hydroxide ions, or a calcium silicate hydrate, from the three-component $CaO$—$SiO_2$—$H_2O$ system. The chemical formula for xonotlite is $Ca_6[Si_6O_{17}](OH)_2$.

The advantage of the component xonotlite in the inventive construction panel is that xonotlite is not flammable and does not begin to break down until around 900° C. As a result, xonotlite imparts a high level of fire resistance to the inventive construction panel. At the same time, due to its high strength, xonotlite imparts high mechanical stability to the construction panel. Another advantage of xonotlite is that this phase is not hazardous to health, so that it is also possible to use the inventive construction panel indoors.

The inventive construction panel preferably comprises xonotlite in a proportion of at least 20% by mass, more preferably in a proportion in the range of 20 to 50% by mass, and even more preferably in a proportion in the range of 20 to 40% by mass.

The information provided herein in % by mass with regard to the proportion of mass of a component of the inventive construction panel is always based on the total mass of the inventive construction panel, unless otherwise stated in individual cases.

The expanded perlite component has considerable advantages in the inventive construction panel. For example, expanded perlite has only a low density or a low bulk density, so that a construction panel with a low density can be made available due to the proportion of expanded perlite in such a construction panel. At the same time, expanded perlite is mechanically stable and has high resistance to fire, so that using expanded perlite in the construction panel can simultaneously provide a construction panel with high mechanical stability, in particular even given uninterrupted high temperature loading for a lengthy period of time. Furthermore, expanded perlite is not hazardous to health, so it is possible to use the panel indoors. Furthermore, due to the proportion of expanded perlite, the construction panel is also easy to process mechanically.

In particular, however, according to the invention it has also surprisingly been found that expanded perlite is particularly advantageous for the construction panel for reasons that result from the production of an inventive construction panel. For example, the open pore volume of the expanded perlite can be partially filled with xonotlite. This is due to the fact that the components forming the xonotlite (i.e. in particular a component comprising calcium oxide, a component comprising silicon dioxide, and water) penetrate into the open pore volume of the expanded perlite during the production of the construction panel, form xonotlite there, and the open pores of the expanded perlite accordingly fill with xonotlite, at least partially. However, this at least partial filling of the open pores of the expanded perlite with xonotlite has proven to be advantageous for several reasons. For example, the absorbency of the expanded perlite is considerably reduced by the open pores being filled with xonotlite, so that only a small amount of a coating or hydrophobization agent is required for any impregnation of the construction panel, for example with a coat of paint or hydrophobization agent, because the expanded perlite largely absorbs this substance only superficially. However, this can be particularly advantageous when such impregnation comprises organic constituents which could impair the fire resistance of the construction panel. Furthermore, it has surprisingly been found that the mechanical stability of the expanded perlite is increased by the xonotlite partially embedded in the open porosity of the expanded perlite. This also increases the overall mechanical stability of the construction panel.

In this respect, one particularly preferred embodiment provides that the open pores of the expanded perlite are partially filled with xonotlite.

Surprisingly, according to the invention it has been found that the grain size of the expanded perlite in the construction panel can be of particular importance, in particular for the mechanical stability of the construction panel, in particular even when exposed to fire. Thus, the mechanical stability of the inventive construction panel can be increasingly raised if the expanded perlite is increasingly present in the construction panel with a grain size of at most 1.5 mm. In this respect, according to one particularly preferred embodiment it is provided that the expanded perlite is largely or completely present with a grain size of at most 1.5 mm.

According to one preferred embodiment, it is provided that the expanded perlite is at least 50% by mass, more preferably at least 90% by mass, and even more preferably 100% by mass in a grain size below 1.5 mm. Furthermore, it can preferably be provided that the expanded perlite is at least 50% by mass, more preferably at least 90% by mass, and even more preferably 100% by mass in a grain size in the range of 0.01 to 1.5 mm. The information provided herein with regard to the proportions by mass of the expanded perlite in a certain grain size is in each case based on the total mass of the expanded perlite in the inventive construction panel.

The grain size of the expanded perlite in the construction panel can preferably be determined based on a polished section of the construction panel, in particular using microscopic analysis of the polished section, particularly preferably microscopically using imaging, computer-aided analysis programs.

The inventive construction panel preferably comprises the expanded perlite in a proportion in the range of 8 to 20% by mass, more preferably in a proportion in the range of 10 to 15% by mass.

The mechanical strength of the inventive construction panel can be increased even further using fibers. In this respect, the construction panel forms a fiber-reinforced composite material in which the fibers are embedded in the matrix of the construction panel that is formed from the xonotlite.

The inventive construction panel preferably comprises fibers in a proportion in the range of 1.5 to 10% by mass, more preferably in a proportion in the range of 2 to 8% by mass.

According to one particularly preferred embodiment, the fibers are in the form of at least one of the following types of fibers: organic fibers or inorganic fibers.

Organic fibers can preferably be in the form of at least one of the following types of fibers: cellulose fibers or carbon fibers. If the organic fibers are in the form of cellulose fibers, they can particularly preferably be in the form of Kraft cellulose fibers.

The construction panel preferably comprises cellulose fibers, in particular in the form of Kraft cellulose fibers, in a proportion in the range of 1 to 6% by mass, more preferably in a proportion in the range of 1 to 4% by mass.

The cellulose fibers, in particular in the form of Kraft cellulose fibers, preferably have at least one of the following geometries: a mean fiber diameter in the range of 10 to 30 μm or a mean fiber length in the range of 0.5 to 3 mm.

Inorganic fibers can preferably be in the form of glass fibers, particularly preferably in the form of at least one of the following types of glass fibers: AES fibers, mineral fibers, basalt fibers, alumina fibers ($Al_2O_3$ fibers), or silicate fibers ($SiO_2$ fibers).

According to one particularly preferred embodiment, it is provided that the glass fibers are in the form of AES fibers. As is well known, "AES fibers" (=alkaline earth silicate fibers) are glass fibers based on the material system MgO—CaO—$SiO_2$, i.e. alkaline earth silicate fibers. The AES fibers are particularly preferably highly pure, that is, with only a very small proportion of other oxides in addition to the oxides MgO, CaO, and $SiO_2$, since the fibers thereby create high resistance to fire and withstand high application temperatures. One advantage of AES fibers in particular is that they are not classified as hazardous substances, in particular they are not carcinogenic, so that the inventive construction panel, insofar as it comprises AES fibers, can easily be used indoors. If the glass fibers are in the form of AES fibers, they preferably have a chemical composition with a proportion of $SiO_2$ of at least 60% by mass, more preferably with a proportion in the range of 60 to 90% by mass, even more preferably with a proportion in the range of 60 to 85% by mass, and still more preferably with a proportion in the range of 70 to 85% by mass. Furthermore, the AES fibers, insofar as they have the above chemical proportions of $SiO_2$, preferably have a chemical composition with a proportion of MgO and CaO in a total mass in the range of 10 to 40% by mass, more preferably with a proportion in the range of 15 to 40% by mass, and even more preferably in a proportion in the range of 15 to 30% by mass. According to one preferred embodiment, it is provided that the AES fibers, insofar as they have the above chemical proportions of $SiO_2$, MgO, and CaO, have a proportion of further chemical substances in a proportion of less than 3% by mass. The above information regarding the chemical composition of the AES fibers is based on the total mass of the glass fibers in the inventive construction panel.

The inventive construction panel preferably comprises glass fibers, in particular in the form of AES fibers, in a proportion in the range of 0.5 to 5% by mass, more preferably in a proportion in the range of 0.5 to 4% by mass.

The inventive construction panel preferably comprises glass fibers, in particular with the above chemical composition, that have a classification temperature according to DIN EN 1094-1:2008-09 of at least 1200° C.

The glass fibers preferably have a mean fiber diameter in the range of 5 to 10 μm, more preferably in the range of 7 to 9 μm.

The AES fibers preferably have at least one of the following geometries: a mean fiber diameter in the range of 5 to 15 μm (more preferably in the range of 7 to 9 μm) or a mean fiber length in the range of 1 to 10 mm.

According to one particularly preferred embodiment, the fibers are in the form of AES fibers and Kraft cellulose fibers.

In the inventive construction panel, xonotlite forms a matrix in which the expanded perlite and the fibers are embedded.

The expanded perlite and the fibers are preferably evenly distributed over the volume of the inventive construction panel.

As stated above, construction panels with high resistance to fire, in particular so-called fire protection panels, in particular in the form of cement-set panels, in particular based on hydraulically setting cements such as Portland cements and alumina cements, in particular high-alumina cements, are known. According to the invention, however, it was found that the resistance to fire and in particular also the mechanical strength of the inventive construction panel can be worsened by such cements. In particular, these cements can also adversely affect the mechanical stability of the xonotlite when the construction panel is subject to temperature loading. Therefore, according to one preferred embodiment, it is provided that the inventive construction panel has no, or only very small proportions of, cements, in particular Portland cements, alumina cements, and high-alumina cements.

The inventive construction panel preferably contains cements, in particular hydraulically setting cements, in particular Portland cements, alumina cements, and high-alumina cements, only in a proportion of less than 10% by mass, more preferably in a proportion of less than 5% by mass, and even more preferably in a proportion of less than 1% by mass.

According to one preferred embodiment, the inventive construction panel comprises xonotlite, the expanded perlite, and the fibers in a proportion of at least 33% by mass. Furthermore, it can preferably be provided that the inventive construction panel comprises the xonotlite, the expanded perlite, and the fibers in a proportion of at most 63% by mass. According to one preferred embodiment, the inventive construction panel comprises the xonotlite, the expanded perlite, and the fibers in a proportion in the range of 33 to 63% by mass, more preferably in a proportion in the range of 35 to 55% by mass.

The inventive construction panel can comprise anhydride as a further component.

Such a component in the form of anhydride, that is, $CaSO_4$, has the particular advantage that the xonotlite is stabilized by the anhydride, especially when the construction panel is subject to temperature loading. In this respect, anhydride breaks down endothermically starting at a temperature of about 1180° C., so that the inventive construction panel can be cooled and the breaking down of the xonotlite can be delayed.

The inventive construction panel preferably comprises anhydride in a proportion in the range of 0.5 to 5% by mass, more preferably in a proportion in the range of 0.8 to 2% by mass.

The inventive construction panel can comprise calcium carbonate as a further component.

Calcium carbonate, that is, $CaCO_3$, can be present in the inventive construction panel in at least one of the following mineralogical phases: calcite, aragonite, or vaterite.

Just like anhydride, calcium carbonate also has the advantage of stabilizing xonotlite in the construction panel, especially given temperature loading. Thus, calcium carbonate begins to break down endothermically starting at a temperature of around 825° C., so that the construction panel can also be cooled and the breakdown of the xonotlite can be inhibited.

The inventive construction panel preferably comprises calcium carbonate in a proportion in the range of 1 to 10% by mass, even more preferably in a proportion in the range of 1 to 5% by mass.

According to one preferred embodiment, it is provided that the inventive construction panel comprises the xonotlite, the expanded perlite, the fibers, the anhydride, and the calcium carbonate in a proportion of at least 35% by mass. Furthermore, it can preferably be provided that the inventive construction panel comprises the xonotlite, the expanded perlite, the fibers, the anhydride, and the calcium carbonate in a proportion of at most 70% by mass. According to one preferred embodiment, it is provided that the inventive construction panel comprises the xonotlite, the expanded perlite, the fibers, the anhydride, and the calcium carbonate in a proportion in the range of 35 to 70% by mass, more preferably in a proportion in the range of 37 to 57% by mass.

During the production of the inventive construction panel, in particular using the inventive method as described in more detail below, further phases can form. These further phases can in particular be phases in the three-component $CaO—SiO_2—H_2O$ system that are not in the form of xonotlite (hereinafter referred to as "further CSH phases"). In particular, these further CSH phases can be in the form of at least one of the following phases: scawtite ($Ca_7Si_6O_{18}CO_3$ $(H_2O)_2$), tobermorite, or X-ray amorphous calcium silicate phases (so-called "calcium silicate gel phases" or "CS gel phases").

In this respect, it can preferably be provided that the inventive construction panel has such further CSH phases in a proportion below 65% by mass, in particular in a proportion in the range of 30 to 65% by mass, and more preferably in a proportion in the range of 43 to 63% by mass.

The inventive construction panel preferably comprises tobermorite in a proportion of at most 25% by mass, more preferably in a proportion in the range of 10 to 25% by mass, and even more preferably in a proportion in the range of 10 to 20% by mass.

The inventive construction panel preferably comprises scawtite in a proportion of at most 10% by mass, more preferably in a proportion in the range of 1 to 10% by mass, and even more preferably in a proportion in the range of 1 to 8% by mass.

The inventive construction panel preferably comprises X-ray amorphous calcium silicate phases in a proportion in the range of 20 to 30% by mass.

According to one embodiment, it can be provided that the inventive construction panel comprises the xonotlite, the expanded perlite, the fibers, the anhydride, the calcium carbonate, and the other CSH phases in a total mass of at least 92% by mass. According to one embodiment, it can be provided that the inventive construction panel contains the xonotlite, the expanded perlite, the fibers, the anhydride, the calcium carbonate, and the other CSH phases in a proportion in the range of 92 to 100% by mass, and more preferably in a proportion in the range of 96 to 100% by mass.

The inventive construction panel can comprise proportions of quartz, which can result in particular from the production of the inventive construction panel, in particular using the inventive method as described in more detail below. The inventive construction panel preferably has quartz in a proportion of at most 10% by mass, more preferably in a proportion in the range of 1 to 10% by mass, and even more preferably in a proportion in the range of 1 to 5% by mass.

The mineralogical composition of the panel is preferably determined by means of X-ray diffraction analysis, particularly preferably by means of the Rietveld method.

With regard to the chemical composition of the panel, the latter preferably has a proportion of $SiO_2$ of 40 to 50% by mass, more preferably of 42 to 48% by mass, and a proportion of CaO of 35 to 45% by mass, more preferably 36 to 43% by mass, and even more preferably 38 to 43% by mass.

The chemical composition of the panel is determined by means of X-ray fluorescence analysis in accordance with DIN EN ISO 12677: 2013-02.

Furthermore, the chemical composition of the panel can have a loss on ignition in a proportion in the range of 5 to 15% by mass. The loss on ignition can be caused in particular by water of crystallization and cellulose fibers in the construction panel.

The panel preferably has a chemical composition with a proportion of $Al_2O_3$ below 3% by mass, in particular in the range of 1 to <3% by mass.

Furthermore, the panel preferably has a chemical composition according to which $Fe_2O_3$, $SO_3$, MgO, $K_2O$, and $Na_2O$ are each present in a proportion of less than 1% by mass, wherein one, a plurality of, or all of these substances can be present in the construction panel with such a proportion below 1% by mass.

The panel preferably has a chemical composition according to which the proportion of $SiO_2$ and CaO is at least 80% by mass, and preferably a proportion of $SiO_2$ and CaO in the range of 80 to 90% by mass, even more preferably in a proportion in the range of 82 to 88% by mass.

Furthermore, with regard to the chemical composition of the construction panel, the mass ratio of CaO to $SiO_2$ is preferably below 1.0, and in particular is in the range of 0.85 to <1.0.

Because of the expanded perlite in the inventive construction panel, it is possible to provide the latter with a low density. The inventive construction panel preferably has a density of at most 900 kg/m³. The density of the construction panel is particularly preferably in the range of 400 to 900 kg/m³. The density is determined after drying at 105° C. to constant weight.

The inventive construction panel preferably has a thickness in the range of 10 to 60 mm.

Due to the high mechanical stability, in particular also given fire loading, the inventive construction panel can be made available with a long length. In this respect, the inventive construction panel can have a length of up to 2.5 m.

The inventive construction panel can in particular be classified as "non-combustible A1" according to DIN EN 13501-1: 2010-01.

In particular, however, the inventive construction panel can be made available with high fire resistance, wherein the panel remains mechanically stable, in particular even given uninterrupted fire loading. In particular, the inventive construction panel has a mechanical stability for at least 90 minutes given exposure to fire according to the standard temperature curve according to DIN EN 1363-1:2012-10.

As explained below, the inventive construction panel preferably sets in an autoclave. After setting in the autoclave, the construction panel can be provided with further components, for example impregnation (such as a hydrophobization agent or other coating, for example), lamination (for example metal lamination), or with fasteners (for example, clips, screwed-on profiles, etc.). These additional components are not taken into account in the aforementioned information on the proportions by mass of components of the construction panel in the total mass of the construction panel.

For production of a construction panel with high resistance to fire, according to the invention a method is provided that comprises the following steps:
Providing a batch comprising:
    a component comprising calcium oxide;
    a component comprising silicon dioxide;
    expanded perlite;
    fibers; and,
    water;
Forming the batch;
Applying pressure and temperature to the formed batch such that the component comprising calcium oxide, the component comprising silicon dioxide, and the water form xonotlite.

The inventive method is particularly preferably used for producing an inventive construction panel described herein, so that the construction panel produced using the inventive method can particularly preferably have the features of the inventive construction panel described herein.

The inventive method is based in particular on the surprising finding that construction panels with high resistance to fire and the properties of the inventive construction panel described in more detail herein can be produced, provided that these construction panels are made from one batch that comprises a component comprising calcium oxide, a component comprising silicon dioxide, expanded perlite, fibers, and water, wherein the batch is formed and the formed batch is then subjected to pressure and temperature such that the component comprising calcium oxide and the component comprising silicon dioxide with the water form xonotlite.

Particularly surprising is the finding according to the invention that such a construction panel with the advantageous properties described herein can be produced as long as the batch comprises expanded perlite.

The use of expanded perlite has, on the one hand, the considerable advantages described above for the construction panel produced using the method, specifically, in particular, a reduction in the density of the construction panel, simultaneously with high strength, good fire resistance, and good mechanical processability of the construction panel.

In addition, however, the use of expanded perlite also has considerable advantages in the production of the construction panel. For example, it has surprisingly been found that in particular the high absorption capacity of the expanded perlite, which the latter has due to its high open porosity, is very advantageous in the production of the construction panel. This is because, due to the high absorption capacity of the expanded perlite, the water of the batch required for the formation of the xonotlite can largely be absorbed by the expanded perlite and later released back to the batch, especially while the formed batch is being loaded with pressure and temperature and the xonotlite is being formed because of this. Because the water of the batch is absorbed in the expanded perlite, however, a batch with a high water content is still easy to process and, in particular, cannot have a slurry-like consistency, but rather has an earth-moist consistency. Due to this earth-moist consistency of the batch, however, it is particularly easy to process the latter, in particular it is also particularly easy to form the latter. In particular, the batch does not also have to be dried before forming.

In this respect, the inventive method can in particular be carried out as a semi-dry method.

In order to be able to satisfy these advantageous properties during the production of the construction panel using the inventive method, an expanded perlite with a high open porosity is preferably provided, wherein the expanded perlite preferably has an open porosity with a proportion of more than 90% by volume, based on the total volume of the expanded perlite.

Furthermore, according to the invention it has been found that the expanded perlite in particular satisfies the above advantageous functions during the production of the construction panel using the inventive method when said expanded perlite has a specific grain size.

In this respect, according to one particularly preferred embodiment it is provided that the expanded perlite largely or solely has a grain size of at most 1.5 mm.

According to one preferred embodiment, it is provided that the expanded perlite in the batch of the inventive method is at least 50% by mass, more preferably at least 90% by mass, and even more preferably 100% by mass in a grain size below 1.5 mm. Furthermore, it can preferably be provided that the expanded perlite is at least 50% by mass, more preferably at least 90% by mass, and even more preferably 100% by mass in a grain size in the range of 0.01 to 1.5 mm. The information given on the proportions of mass of the expanded perlite in a certain grain size is based on the total mass of the expanded perlite in the batch. The grain size of the expanded perlite can be determined by sieving in accordance with DIN EN 13055: 2016-11.

The batch of the inventive method preferably comprises the expanded perlite in a proportion in the range of 5 to 20% by mass, more preferably in a proportion in the range of 5 to 15% by mass.

The information given here with respect to proportions of mass of a component of the batch is always based on the total mass of the batch unless otherwise specified in a specific case.

According to the invention, it was found that, when the inventive method is carried out, xonotlite can be formed from the component comprising calcium oxide and the component comprising silicon dioxide together with the water in particular if the mass ratio of the chemical proportion of CaO to the chemical proportion of $SiO_2$ in the total mass of the component comprising calcium oxide and the component comprising silicon dioxide (that is, the so-called C/S ratio) is greater than 1.00 and in particular is greater than 1.00 and in particular is at most 1.20. In this respect, according to the invention it is preferably provided that the mass ratio of the chemical proportion of CaO to the chemical proportion of $SiO_2$ in the total mass of the component comprising calcium oxide and the component comprising silicon dioxide in the batch of the inventive method is greater than 1.00, further preferably is at most 1.20, and particularly preferably is in the range of 1.05 to 1.15.

The component of the batch comprising calcium oxide (CaO) can comprise one or a plurality of substances comprising calcium oxide. If the component comprising calcium oxide comprises calcium oxide, the latter does not have to be in the form of calcium oxide. On the contrary, calcium oxide alone is a chemical constituent of the component comprising calcium oxide, so that the calcium can also be present, for example, in a form other than the form of an oxide, for example as a hydroxide.

According to one preferred embodiment, the component of the batch comprising calcium oxide comprises calcium hydroxide, that is, $Ca(OH)_2$. According to one particularly preferred embodiment, the component comprising calcium oxide is in the form of calcium hydroxide.

The batch preferably comprises the component comprising calcium oxide in a proportion in a range of 30 to 40% by mass, more preferably in a proportion in the range of 32 to 38% by mass.

The component of the batch comprising silicon dioxide ($SiO_2$) can comprise one or more substances comprising silicon dioxide. If the component comprising silicon dioxide comprises silicon dioxide, this does not have to be in the form of silicon dioxide. On the contrary, silicon dioxide alone is a chemical constituent of the component comprising silicon dioxide, so that the silicon can, for example, also be present in a form other than the form of an oxide, for example as silicic acid.

According to one preferred embodiment, the component of the batch comprising silicon dioxide comprises quartz. According to one preferred embodiment, the component comprising silicon dioxide is in the form of quartz. This quartz is particularly preferably fine-grained, in particular in the form of quartz powder. According to one preferred embodiment, quartz or quartz powder is at least 95% by mass, based on the total mass of the quartz, with a grain size less than 200 µm, more preferably less than 160 µm.

The batch preferably comprises the component comprising silicon dioxide in a proportion in the range of 17 to 27% by mass, more preferably in a proportion in the range of 20 to 25% by mass.

The batch preferably comprises fibers in a proportion in the range of 1 to 10% by mass, more preferably in a proportion in the range of 1.5 to 8% by mass.

According to one particularly preferred embodiment, the fibers are in the form of at least one of the following types of fibers: organic fibers or inorganic fibers.

Organic fibers can preferably be in the form of at least one of the following types of fibers: cellulose fibers or carbon fibers. If the organic fibers are in the form of cellulose fibers, they can particularly preferably be in the form of Kraft cellulose fibers.

The batch comprises cellulose fibers, in particular in the form of Kraft cellulose fibers, preferably in a proportion in the range of 0.5 to 6% by mass, more preferably in a proportion in the range of 1 to 4% by mass.

The cellulose fibers, in particular in the form of Kraft cellulose fibers, preferably have at least one of the following geometries: a mean fiber diameter in the range of 10 to 30 µm or a mean fiber length in the range of 0.5 to 3 mm.

Inorganic fibers can preferably be in the form of glass fibers, particularly preferably in the form of at least one of the following types of glass fibers: AES fibers, mineral fibers, basalt fibers, alumina fibers ($Al_2O_3$ fibers), or silicate fibers ($SiO_2$ fibers)

According to one particularly preferred embodiment, it is provided that the glass fibers are in the form of AES fibers. The AES fibers can preferably have the properties of the AES fibers of the inventive construction panel.

The batch preferably comprises glass fibers, in particular in the form of AES fibers, in a proportion in the range of 0.5 to 5% by mass, more preferably in a proportion in the range of 0.5 to 4% by mass.

The batch preferably comprises glass fibers, in particular with the above chemical composition, that have a classification temperature according to DIN EN 1094-1:2008-09 of at least 1200° C.

The glass fibers preferably have a mean fiber diameter in the range of 5 to 10 µm, more preferably in the range of 7 to 9 µm.

The AES fibers preferably have at least one of the following geometries: a mean fiber diameter in the range of 5 to 15 µm (more preferably in the range of 7 to 9 µm) or a mean fiber length in the range of 1 to 10 mm.

According to one particularly preferred embodiment, the fibers in the batch are in the form of AES fibers and Kraft cellulose fibers.

The batch preferably comprises water in a proportion in a range of 15 to 35% by mass, more preferably in a proportion in a range of 20 to 30% by mass.

With respect to the dry mass of the batch, that is, the total mass of the batch without the water, the batch comprises the component comprising calcium oxide, the component comprising silicon dioxide, the expanded perlite, and the fibers, preferably in a proportion of at least 95% by mass, more preferably in a proportion of at least 97% by mass.

According to one preferred embodiment, the batch comprises the component comprising calcium oxide, the component comprising silicon dioxide, the expanded perlite, the fibers, and the water in a proportion of at least 96% by mass, more preferably in a proportion of at least 97% by mass.

According to one preferred embodiment, the batch comprises anhydrite in a proportion in the range of 0.5 to 3% by mass, more preferably in a proportion in the range of 1 to 2% by mass.

According to one preferred embodiment, it is provided that the batch comprises a thickener. Such a thickener is a component that thickens the batch so that it is easier to handle. According to one preferred embodiment, a thickener is present in the form of at least one of the following substances: methyl cellulose, xanthan gum, guar, or starch. The thickener is particularly preferably in the form of methyl cellulose, particularly preferably in the form of a modified methyl hydroxyethyl cellulose, in particular in the form of a water-soluble, non-ionic, highly etherified methyl hydroxyethyl cellulose. The batch preferably comprises thickener in a proportion in the range of 0.2 to 0.6% by mass.

According to one preferred embodiment, it is provided that the batch comprises a foaming agent. A foam or air bubbles can be formed in the batch using such a foaming agent. As a result, the density of the batch and, accordingly, the density of the construction panel produced from it, can be reduced. At the same time, the batch can be stabilized using such a foaming agent. According to one preferred embodiment, the foaming agent is in the form of a surfactant. For example, a foaming agent can be present in the form of Sika® foaming agent SB 2 (trademark of Sika Deutschland GmbH). The batch preferably comprises foaming agents in a proportion in the range of 0.05 to 0.25% by mass, more preferably in a proportion in the range of 0.05 to 0.1% by mass.

The batch of the inventive method comprises the component comprising calcium oxide, the component comprising silicon dioxide, the expanded perlite, the fibers, the anhydrite, the thickener and the foaming agent, as well as the water, preferably in a proportion of at least 97% by mass, more preferably in a proportion of at least 99%, and optionally also up to 100%, so that the batch can preferably comprise proportions of these components in the range of 97 to 100% by mass or more, preferably in the range of 99 to 100% by mass.

Forming the batch gives the batch a panel-like shape. The batch is preferably formed by pressing. Another advantage of the batch of the inventive method in particular is that the batch can be shaped using a press according to the prior art for forming construction panels, for example a press for forming cement construction panels or other construction panels for drywall. Since the water of the batch, as stated above, can largely be absorbed by the expanded perlite, the pressed panels prove to be very dimensionally stable mechanically. The batch is preferably pressed using a pressure in the range of 0.2 MPa to 0.32 MPa.

Another advantage of the fact that the water of the batch, as stated above, can largely be absorbed by the expanded perlite, is that practically no water is pressed out of the batch when the latter is pressed.

The compression factor during pressing (that is, the reduction in volume of the batch during pressing) is preferably in the range of 2 to 3.

Before the batch is formed, it can be mixed in order to distribute the components of the batch evenly over the volume of the batch.

The formed batch is subjected to pressure and temperature such that the component comprising calcium oxide, the component comprising silicon dioxide, and the water of the batch form xonotlite. The person skilled in the art knows the necessary ambient conditions, that is, in particular also the necessary pressure and the necessary temperature, for forming xonotlite from these components of the batch using pressure and temperature.

The batch in the autoclave is preferably subjected to pressure and temperature. An autoclave according to the prior art, in particular an industrial autoclave, can preferably be used. For example, an industrial autoclave, as is known, for example, for the production of sand-lime brick, can be used.

When carrying out the inventive method, the batch is preferably acted upon with pressure in the range of 15 to 20 bar, more preferably with pressure in the range of 16 to 18 bar. Pressure in this sense is overpressure, that is, pressure as far as it exceeds the air pressure of the atmosphere at the location of the measured overpressure.

Furthermore, the batch is preferably subjected to a temperature such that a saturated steam pressure is established, in particular at the pressures described above. The temperatures required for this are known to the person skilled in the art and can be determined, for example, using the vapor pressure curve of water. In this respect, a temperature in the range of 200 to 220° C. can be applied to the batch.

The batch is subjected to pressure and temperature for such a period that xonotlite is formed from the components of the batch. According to the invention, it can be provided that pressure and temperature are applied to the batch for a period of time in the range of 8 to 20 hours, in particular for a period of time in the range of 12 to 16 hours.

During the application of pressure and temperature, xonotlite is formed from the components of the batch. Furthermore, during the application of pressure and temperature to the batch, depending on the composition of the batch and the pressure, temperature and length of time of such application, further substances can form from the batch, in particular at least one of the further substances calcium carbonate or further CSH Phases.

Furthermore, the proportion of water in the batch can change while pressure and temperature are applied to the batch. This also results in differences in the composition of the batch and the construction panel with regard to the respective proportion of mass of some components, for example the expanded perlite, the fibers, or the anhydrite.

A construction panel is obtained after the batch has been subjected to pressure and temperature or after autoclaving. This construction panel can then be dried, for example, preferably to a residual moisture content in the range of 8 to 12% by mass, based on the total mass of the construction panel.

In addition, the construction panel obtained using the inventive method can have the features of the inventive construction panel disclosed herein.

The subject matter of the invention also relates to the use of the inventive construction panel in dry wall. For example, this use can take place with the proviso that the construction panel is used to create partition walls, to create ducts for electrical lines, to create ventilation ducts, to create smoke extraction ducts, or to clad beams.

Further features of the inventive construction panel and the inventive method result from the claims and the embodiment described below.

All of the features of the invention can be combined with one another as desired, individually or in combination.

An embodiment of the invention is described in more detail below.

EMBODIMENT

According to one embodiment of the inventive method, a batch was first made available which comprised the components in the proportions of mass according to Table 1 below, each based on the total mass of the batch:

TABLE 1

| Component | Proportion of mass [% by mass] |
| --- | --- |
| Component comprising calcium oxide | 36.8 |
| Component comprising silicon dioxide | 23.6 |
| Expanded perlite | 8.3 |
| Cellulose fibers | 1.3 |
| AES glass fibers | 0.6 |
| Anhydride | 1.3 |
| Thickener | 0.2 |
| Foaming agent | 0.1 |
| Water | 27.8 |

The component comprising calcium oxide was in the form of calcium hydroxide.

The component comprising silicon dioxide was in the form of quartz powder. The quartz powder was 95% by mass, based on the total mass of the quartz powder, with a grain size of less than 50 µm. The quartz powder had a chemical composition with 99% by mass $SiO_2$, based on the total mass of the quartz powder.

The expanded perlite was 100% by mass, based on the total mass of the expanded perlite, with a grain size of less than 1.5 mm, and 98% by mass with a grain size of less than 1.0 mm. Furthermore, the expanded perlite was 95% by mass, again based on the total mass of the expanded perlite, and had a grain size between 0.03 and 1.0 mm.

The cellulose fibers were in the form of Kraft cellulose fibers with a mean fiber diameter of approximately 20 µm and a mean fiber length of approximately 1.9 mm.

The AES glass fibers had a chemical composition, based on the total mass of the AES glass fibers, of 75% by mass $SiO_2$ and 22% by mass CaO+MgO. The mean fiber diameter was about 8 µm.

The foaming agent was in the form of a surfactant (Sika® foaming agent SB 2) and the thickener was in the form of a modified methyl hydroxyethyl cellulose.

The total proportion of calcium hydroxide and quartz powder had a chemical composition in which the mass ratio of CaO to $SiO_2$, based on the total mass of calcium hydroxide and quartz powder, was 1.103.

The batch was mixed in a mixer and then pressed in a commercial hydraulic press with a punch for the production of fire protection panels at a pressure of 0.25 MPa to form a square panel with a side length of 1,250 mm and a thickness of 30 mm.

The pressed panel was then placed in an industrial autoclave for 12 hours at a pressure of 18 bar at saturated steam pressure and the temperature resulting therefrom (about 207° C.).

Finally, the correspondingly autoclaved panel was removed from the autoclave and dried in a drying cabinet to a residual moisture content of about 10% by mass.

The construction panel obtained thereafter was in the form of an inventive construction panel with high resistance to fire.

This construction panel comprised the following components in the proportions by mass according to Table 2 below, each based on the total mass of the construction panel:

TABLE 2

| Component | Proportion of mass [% by mass] |
| --- | --- |
| Xonotlite | 25.6 |
| Expanded perlite | 12.0 |
| Cellulose fibers | 1.8 |
| AES glass fibers | 0.9 |
| Anhydride | 0.8 |
| Calcium carbonate | 1.2 |
| Tobermorite | 24.8 |
| Calcium silicate gel phases | 21.5 |
| Quartz | 1.9 |
| Scawtite | 9.5 |

The mineralogical composition of the construction panel was determined by means of X-ray diffraction analysis using the Rietveld method.

During the microscopic examination of the construction panel, it was found that xonotlite had formed in the open pore volume of the expanded perlite, thereby largely closing the open pores of the expanded perlite.

The chemical composition of the construction panel was determined by means of X-ray fluorescence analysis according to DIN EN ISO 12676:2013-02. The construction panel then had the substances in the proportions of mass according to Table 3 below, based in each case on the total mass of the construction panel:

TABLE 3

| Chemical component | Proportion of mass [% by mass] |
| --- | --- |
| $SiO_2$ | 45.44 |
| $Al_2O_3$ | 1.79 |
| $Fe_2O_3$ | 0.18 |
| BaO | 0.010 |
| MnO | 0.029 |
| $TiO_2$ | 0.043 |
| $V_2O_5$ | <0.001 |
| CaO | 39.60 |
| MgO | 0.53 |
| $K_2O$ | 0.40 |
| $Na_2O$ | 0.59 |
| $SO_3$ | 0.09 |
| Other | <0.05 |
| Loss on ignition | 11.26 |

For determining resistance to fire, the fire behavior of the construction panel was carried out in accordance with DIN EN 1363-1:2012-10 in the form of a beam cladding test (box test) without a substructure, wherein the paneling parts were clamped. Then, when the construction panel was temperature-loaded according to the standard temperature curve according to DIN EN 1363-1:2012-10, the onset of panel sagging was determined only after 138 minutes and at a surface temperature of 1011 K. The construction panel thus exhibited excellent fire resistance.

The invention claimed is:

1. Construction panel with high resistance to fire, comprising:
    xonotlite;
    expanded perlite; and,
    fibers, where the expanded perlite amounts to at least 50% by mass, based on the total mass of the expanded perlite, in a grain size of at most 1.5 mm.

2. Construction panel according to claim 1 which comprises the xonotlite, the expanded perlite, and the fibers in a proportion of at least 33% by mass.

3. Construction panel according to claim 1, which comprises the fibers in the form of at least one of the following fibers: glass fibers or cellulose fibers.

4. Construction panel according to claim 3, which comprises the glass fibers in the form of AES-alkaline earth silicate fibers.

5. Construction panel according to claim 1, which comprises the xonotlite in a proportion in the range of 20 to 50% by mass.

6. Construction panel according to claim 1, which comprises the expanded perlite in a proportion in the range of 8 to 20% by mass.

7. Construction panel according to claim 1, which comprises the fibers in a proportion in the range of 1.5 to 10% by mass.

8. Construction panel according to claim 3, which comprises the cellulose fibers in a proportion in the range of 1 to 6% by mass.

9. Construction panel according to claim 3, which comprises the glass fibers in a proportion in the range of 0.5 to 5% by mass.

10. Construction panel according to claim 1, further comprising anhydrite.

11. Construction panel according to claim 1, which comprises calcium carbonate.

12. Method of producing a construction panel with high resistance to fire, comprising the following steps:
    providing a batch comprising:
        a component comprising calcium oxide;
        a component comprising silicon dioxide;
        expanded perlite;
        fibers; and,
        water;
    forming the batch; and
    applying pressure and temperature to the formed batch such that the component comprising calcium oxide, the component comprising silicon dioxide, and the water form xonotlite, where batch comprises at least 50% by mass of the expanded perline, based on the total mass of the expanded perlite, in a grain size of at most 1.5 mm.

13. Method according to claim 12, in which the batch comprises the expanded perlite in a proportion in the range of 5 to 20% by mass.

* * * * *